US005310715A

United States Patent [19]
Kresge et al.

[11] Patent Number: 5,310,715
[45] Date of Patent: May 10, 1994

[54] METHOD FOR PREPARING A PILLARED LAYERED OXIDE MATERIAL

[75] Inventors: Charles T. Kresge, West Chester, Pa.; Wieslaw J. Roth, Sewell, N.J.

[73] Assignee: Mobil Oil Corp., Fairfax, Va.

[21] Appl. No.: 880,409

[22] Filed: May 8, 1992

Related U.S. Application Data

[63] Continuation-in-part of Ser. No. 811,360, Dec. 20, 1991, which is a continuation-in-part of Ser. No. 776,718, Oct. 15, 1991, abandoned, which is a continuation of Ser. No. 640,330, Jan. 11, 1991, abandoned.

[51] Int. Cl.$^5$ .............................................. B01J 21/06
[52] U.S. Cl. .................................... 502/84; 502/242; 423/329.1; 423/328.2
[58] Field of Search ...................... 423/328.2, 329.1; 502/80, 84, 242

[56] References Cited

U.S. PATENT DOCUMENTS

| | | | |
|---|---|---|---|
| 4,439,409 | 3/1984 | Puppe et al. | 423/328 |
| 4,859,648 | 8/1989 | Landis et al. | 502/242 |
| 4,954,325 | 9/1990 | Rubin et al. | 423/328 |

Primary Examiner—R. Bruce Breneman
Attorney, Agent, or Firm—Alexander J. McKillop; Dennis P. Santini; Edward F. Kenehan, Jr.

[57] ABSTRACT

There is provided a method for preparing a pillared layered material, designated MCM-36, with a characteristic X-ray diffraction pattern. Upon calcination of the swollen, non-pillared form of this material, the layers collapse and condense upon one another in a somewhat disordered fashion to form a non-swellable material. However, when the swollen layered material is intercalated with polymeric oxide pillars, the layer separation is maintained, even after calcination. A quaternary ammonium silicate, such as tetramethylammonium silicate, is used as a pillaring agent for treating the swollen material.

17 Claims, 2 Drawing Sheets

METHOD FOR PREPARING A PILLARED LAYERED OXIDE MATERIAL

CROSS-REFERENCE TO RELATED APPLICATIONS

This application is a continuation-in-part of copending U.S. application Ser. No. 07/811,360, filed Dec. 20, 1991, which is a continuation-in-part of copending U.S. application Ser. No. 07/776,718, filed Oct. 15, 1991, now abandoned, which is a continuation of U.S. application Ser. No. 07/640,330, filed Jan. 11, 1991, now abandoned, the entire disclosures of which are expressly incorporated herein by reference.

BACKGROUND

This application relates to a method for preparing layered materials having layers of polymeric oxides. The layers are spaced apart by pillars. These materials are designated MCM-36 and have characteristic X-ray diffraction patterns.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the distance between the interlamellar layers can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed by, for example, exposing the clays to high temperatures. Accordingly, such layered materials having enhanced surface area are not suited for use in chemical processes involving even moderately severe conditions.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by subtracting the layer thickness from the basal spacing.

Various approaches have been taken to provide layered materials of enhanced interlayer distance having thermal stability. Most techniques rely upon the introduction of an inorganic "pillaring" agent between the layers of a layered material. For example, U.S. Pat. No. 4,216,188 incorporated herein by reference discloses a clay which is cross-linked with metal hydroxide prepared from a highly dilute colloidal solution containing fully separated unit layers and a cross-linking agent comprising a colloidal metal hydroxide solution. However, this method requires a highly dilute forming solution of clay (less than 1 g/l) in order to effect full layer separation prior to incorporation of the pillaring species, as well as positively charged species of cross linking agents. U.S. Pat. No. 4,248,739, incorporated herein by reference, relates to stable pillared interlayered clay prepared from smectite clays reacted with cationic metal complexes of metals such as aluminum and zirconium. The resulting products exhibit high interlayer separation and thermal stability.

U.S. Pat. No. 4,176,090, incorporated herein by reference, discloses a clay composition interlayered with polymeric cationic hydroxy metal complexes of metals such as aluminum, zirconium and titanium. Interlayer distances of up to 16A are claimed although only distances restricted to about 9A are exemplified for calcined samples. These distances are essentially unvariable and related to the specific size of the hydroxy metal complex.

Silicon-containing materials are believed to be a highly desirable species of intercalating agents owing to their high thermal stability characteristics. U.S. Pat. No. 4,367,163, incorporated herein by reference, describes a clay intercalated with silica by impregnating a clay substrate with a silicon-containing reactant such as an ionic silicon complex, e.g., silicon acetylacetonate, or a neutral species such as $SiCl_4$. The clay may be swelled prior to or during silicon impregnation with a suitable polar solvent such as methylene chloride, acetone, benzaldehyde, tri- or tetraalkylammonium ions, or dimethylsulfoxide. This method, however, appears to provide only a monolayer of intercalated silica resulting in a product of small spacing between layers, about 2–3 A as determined by X-ray diffraction.

U.S. Pat. No. 4,859,648 describes layered oxide products of high thermal stability and surface area which contain interlayer polymeric oxides such as polymeric silica. These products are prepared by ion exchanging a layered metal oxide, such as layered titanium oxide, with organic cation, to spread the layers apart. A compound such as tetraethylorthosilicate, capable of forming a polymeric oxide, is thereafter introduced between the layers. The resulting product is treated to form polymeric oxide, e.g., by hydrolysis, to produce the layered oxide product. The resulting product may be employed as a catalyst material in the conversion of hydrocarbons.

Crystalline oxides include both naturally occurring and synthetic materials. Examples of such materials include porous solids known as zeolites. The structures of crystalline oxide zeolites may be described as containing corner-sharing tetrahedra having a three-dimensional four-connected net with T-atoms at the vertices of the net and O-atoms near the midpoints of the connecting lines. Further characteristics of certain zeolites are described in *Collection of Simulated XRD Powder Patterns for Zeolites* by Roland von Ballmoos, Butterworth Scientific Limited, 1984.

Synthetic zeolites are often prepared from aqueous reaction mixtures comprising sources of appropriate oxides. Organic directing agents may also be included in the reaction mixture for the purpose of influencing the production of a zeolite having the desired structure. The use of such directing agents is discussed in an article by Lok et al. entitled "The Role of Organic Molecules in Molecular Sieve Synthesis" appearing in Zeolites, Vol. 3, October, 1983, pp. 282–291.

After the components of the reaction mixture are properly mixed with one another, the reaction mixture is subjected to appropriate crystallization conditions. Such conditions usually involve heating of the reaction mixture to an elevated temperature possibly with stirring. Room temperature aging of the reaction mixture is also desirable in some instances.

After the crystallization of the reaction mixture is complete, the crystalline product may be recovered from the remainder of the reaction mixture, especially the liquid contents thereof. Such recovery may involve filtering the crystals and washing these crystals with water. However, in order to remove all of the undesired residue of the reaction mixture from the crystals, it is often necessary to subject the crystals to a high temperature calcination e.g., at 500° C., possibly in the presence of oxygen. Such a calcination treatment not only removes water from the crystals, but this treatment also serves to decompose and/or oxidize the residue of the organic directing agent which may be occluded in the pores of the crystals, possibly occupying ion exchange sites therein.

In accordance with aspects of inventive subject matter described herein, it has been discovered that a certain synthetic crystalline oxide undergoes a transformation during the synthesis thereof from an intermediate swellable layered state to a non-swellable final state having order in three dimensions, the layers being stacked upon one another in an orderly fashion. This transformation may occur during the drying of the recovered crystals, even at moderate temperatures, e.g., 110° C. or greater. By interrupting the synthesis of these materials prior to final calcination and intercepting these materials in their swellable intermediate state, it is possible to interpose materials such as swelling, pillaring or propping agents between these layers before the material is transformed into a non-swellable state. When the swollen, non-pillared form of these materials is calcined, these materials may be transformed into materials which have disorder in the axis perpendicular to the planes of the layers, due to disordered stacking of the layers upon one another.

SUMMARY

There is provided a method for preparing a pillared layered material, said method comprising the steps of:
(i) preparing a reaction mixture capable of forming a layered material upon crystallization, said reaction mixture containing sufficient amounts of alkali or alkaline earth metal cations, a source of silica containing at least about 30 wt % solid silica, an oxide of aluminum, water and hexamethyleneimine;
(ii) maintaining said reaction mixture under sufficient crystallization conditions until crystals of layered material are formed;
(iii) swelling said layered material of step (ii) by contacting said layered material with a suitable swelling agent; and
(iv) pillaring the swollen material of step (iii) by contacting the swollen material with a quaternary ammonium silicate solution under conditions sufficient to pillar said swollen material.

EMBODIMENTS

Figure 1:
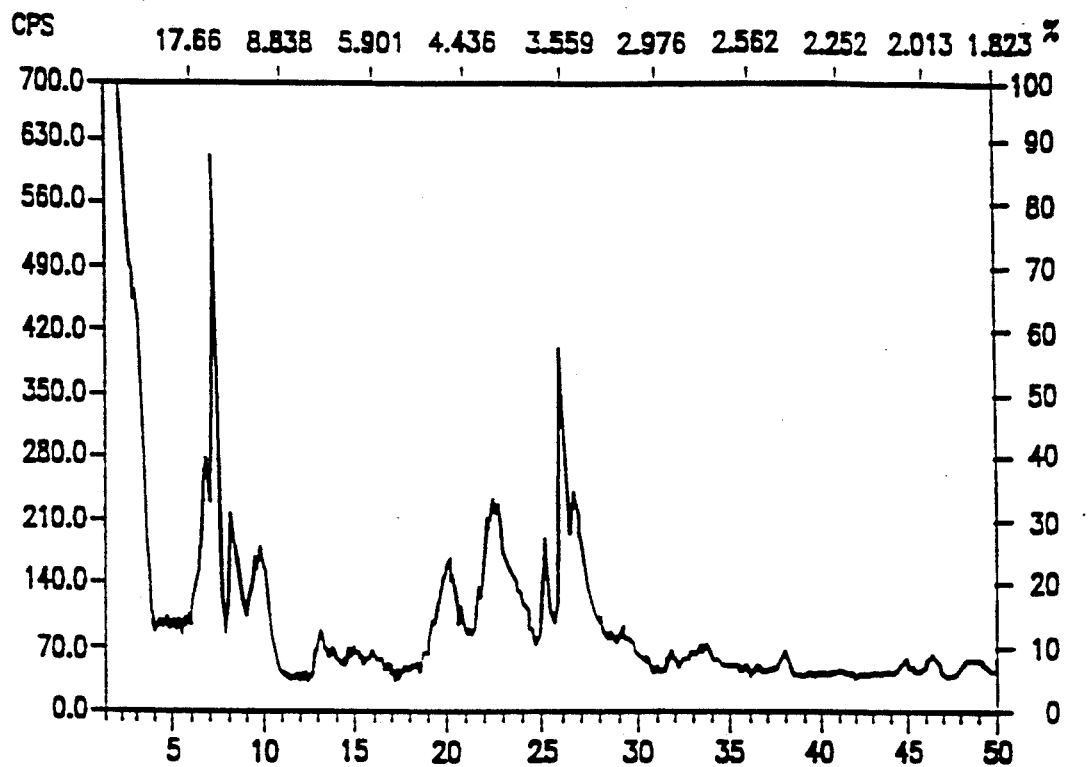
FIG. 1 is an X-ray diffraction pattern of an as-synthesized form of a layered material which may be swollen and pillared.

The quarternary ammonium cation of the quaternary ammonium silicate used herein as a pillaring agent may be the cation of a quaternary ammonium compound which is capable of dissolving silica in aqueous solution. Examples of such quaternary ammonium compounds include tetraalkylammonium hydroxides, wherein the alkyl groups of the tetraalkylammonium cations are the same or different and have from 1 to 5 carbon atoms. A preferred quaternary ammonium cation is tetramethylammonium (TMA).

The quaternary ammonium silicate pillaring agent may be prepared by dissolving silica in an aqueous solution of quaternary ammonium hydroxide. The concentration of silica in this solution may be from about 1 to about 30 weight percent. The molar ratio of quaternary ammonium to silicon (e.g., TMA/Si molar ratio, when the quaternary ammonium cation is TMA) may be from about 0.01 to about 10, especially about 0.5.

It will be understood that the quaternary ammonium silicate solution may contain a plurality of silicon atoms in each anionic species. These silicon-containing ions may vary in size, but at least some of these anions are believed to be sufficiently small to penetrate into the interspathic region of the swollen layered material.

The precise manner in which the quaternary ammonium pillaring agent serves to pillar the swollen material is not certain. When the swollen material is calcined under conditions sufficient to remove the swelling agent, the layers collapse upon one another, as evidenced by a substantial decrease of the d-spacing of the lowest angle peak in the x-ray diffraction pattern, taken before and after calcination of the material. However, upon treating the swollen material with a quaternary ammonium solution under appropriate conditions, the pillared material can withstand such calcination conditions sufficient to remove swelling agent without the layers of the material collapsing upon one another, as evidenced by essentially no decrease in the d-spacing of the lowest angle peak of the x-ray diffraction pattern, taken before and after calcination of the material. The calcined, pillared material also has considerable porosity in the interspathic region, as evidenced by the superior sorption capacity of the calcined, pillared material for certain molecules, as compared with the sorption capacity of the calcined swollen material for these molecules.

After the pillaring treatment with the quaternary ammonium solution, the pillared material may be calcined in the presence or absence of oxygen under conditions sufficient to remove organic material from the pillared material Such organic material may include residual hexamethyleneimine templating agent, swelling agent cations (e.g., cetyltrimethylammonium cations) and/or quaternary ammonium pillaring agent cations (e.g., TMA cations). Prior to such calcination, cations in the as-synthesized pillared material may be exchanged with ammonium (i.e., $NH_4+$) cations. The ammonium exchanged as-synthesized pillared material may be calcined under conditions sufficient to decompose ammonium (i.e. $NH_4+$) cations and liberate ammonia (i.e., $NH_3$) gas, as well as to decompose and/or oxidize residual organic materials.

After calcination of the pillared material, the interspathic silicon-containing "pillars" are believed to be in the form of interspathic polymeric silica. It will be understood, however, that the pillars of the present material need not have any particular morphology or shape, such as column shapes. These pillars may be in a variety of shapes and may be in any form which serves to prop open the layers of the pillared material while still maintaining substantial interspathic porosity.

The present layered oxide material may be prepared from an intermediate material which is crystallized in the presence of a hexamethyleneimine directing agent and which, if calcined, without being swollen would be transformed into a material having an X-ray diffraction pattern as shown in Table 1.

TABLE 1

| Interplanar d-Spacing (A) | Relative Intensity, $I/I_0 \times 100$ |
|---|---|
| 30.0 ± 2.2 | w-m |
| 22.1 ± 1.3 | w |
| 12.36 ± 0.2 | m-vs |
| 11.03 ± 0.2 | m-s |
| 8.83 ± 0.14 | m-vs |
| 6.86 ± 0.14 | w-m |
| 6.18 ± 0.12 | m-vs |
| 6.00 ± 0.10 | w-m |
| 5.54 ± 0.10 | w-m |
| 4.92 ± 0.09 | w |
| 4.64 ± 0.08 | w |
| 4.41 ± 0.08 | w-m |
| 4.25 ± 0.08 | w |
| 4.10 ± 0.07 | w-s |
| 4.06 ± 0.07 | w-s |
| 3.91 ± 0.07 | m-vs |
| 3.75 ± 0.06 | w-m |
| 3.56 ± 0.06 | w-m |
| 3.42 ± 0.06 | vs |
| 3.30 ± 0.05 | w-m |
| 3.20 ± 0.05 | w-m |
| 3.14 ± 0.05 | w-m |
| 3.07 ± 0.05 | w |
| 2.99 ± 0.05 | w |
| 2.82 ± 0.05 | w |
| 2.78 ± 0.05 | w |
| 2.68 ± 0.05 | w |
| 2.59 ± 0.05 | w |

The values in this Table and like tables presented hereinafter were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensities, 100 $I/I_o$, where $I_o$ is the intensity of the strongest line or peak, and d (obs.) the interplanar spacing in Angstrom Units (A), corresponding to the recorded lines, were determined. In Tables 1-8, the relative intensities are given in terms of the symbols w=weak, m=medium, s=strong and vs=very strong. In terms of intensities, these may be generally designated as follows:

| | |
|---|---|
| w = | 0–20 |
| m = | 20–40 |
| s = | 40–60 |
| vs = | 60–100 |

The material having the X-ray diffraction pattern of Table 1 is known as MCM-22 and is described in U.S. Pat. No. 4,954,325, the entire disclosure of which is incorporated herein by reference. This material can be prepared from a reaction mixture containing sources of alkali or alkaline earth metal (M), e.g., sodium or potassium, cation, an oxide of trivalent element X, e.g., aluminum, an oxide of tetravalent element Y, e.g., silicon, an organic (R) directing agent, hereinafter more particularly described, and water, said reaction mixture having a composition, in terms of mole ratios of oxides, within the following ranges:

| Reactants | Useful | Preferred |
|---|---|---|
| $YO_2/X_2O_3$ | 10–80 | 10–60 |
| $H_2O/YO_2$ | 5–100 | 10–50 |
| $OH^-/YO_2$ | 0.01–1.0 | 0.1–0.5 |
| $M/YO_2$ | 0.01–2.0 | 0.1–1.0 |
| $R/YO_2$ | 0.05–1.0 | 0.1–0.5 |

In the synthesis method for preparing the material having the X-ray diffraction pattern of Table 1, the source of $YO_2$ must be comprised predominately of solid $YO_2$, for example at least about 30 wt. % solid $YO_2$ in order to obtain the desired crystal product. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors crystal formation from the above mixture and is a distinct improvement over the synthesis method taught in U.S. Pat. No. 4,439,409. If another source of oxide of silicon e.g., Q-Brand (a sodium silicate comprised of about 28.8 wt. % $SiO_2$, 8.9 wt. % $Na_2O$ and 62.3 wt. % $H_2O$) is used, crystallization yields little or none of the crystalline material having the X-ray diffraction pattern of Table 1. Impurity phases of other crystal structures, e.g., ZSM-12, are prepared in the latter circumstance. Preferably, therefore, the $YO_2$, e.g., silica, source contains at least about 30 wt. % solid $YO_2$, e.g., silica, and more preferably at least about 40 wt. % solid $YO_2$, e.g., silica.

Crystallization of the crystalline material having the X-ray diffraction pattern of Table 1 can be carried out at either static or stirred conditions in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g., from about 24 hours to about 60 days. Thereafter, the crystals are separated from the liquid and recovered.

The organic directing agent for use in synthesizing the present crystalline material from the above reaction mixture may be hexamethyleneimine which has the following structural formula:

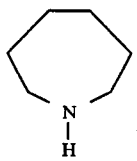

Other organic directing agents which may be used include 1,4-diazacycloheptane, azacyclooctane, aminocyclohexane, aminocycloheptane, aminocyclopentane, N,N,N-trimethyl-1-adamantanammonium ions, and N,N,N-trimethyl-2-adamantanammonium ions. In general, the organic directing agent may be selected from the group consisting of heterocyclic imines, cycloalkyl amines and adamantane quaternary ammonium ions.

It should be realized that the reaction mixture components can be supplied by more than one source. The reaction mixture can be prepared either batchwise or continuously. Crystal size and crystallization time of the crystalline material will vary with the nature of the reaction mixture employed and the crystallization conditions.

Synthesis of crystals may be facilitated by the presence of at least 0.01 percent, e.g., 0.10 percent or 1 percent, seed crystals (based on total weight) of crystalline product.

The crystalline material having the X-ray diffraction pattern of Table 1 passes through an intermediate stage. The material at this intermediate stage has a different X-ray diffraction pattern than that set forth in Table 1. It has further been discovered that this intermediate material is swellable with the use of suitable swelling agents such as cetyltrimethylammonium compounds, e.g., cetyltrimethylammonium hydroxide. However, when this swollen intermediate material is calcined, even under mild conditions, whereby the swelling agent is removed, the material can no longer be swollen with such swelling agent. By way of contrast it is noted that various layered silicates such as magadiite and kenyaite may be swellable with cetyltrimethylammonium compounds both prior to and after mild calcination.

The present swollen products may have relatively high interplanar distance (d-spacing), e.g., greater than about 6 Angstrom, e.g., greater than about 10 Angstrom and even exceeding 30 Angstrom. These swollen materials may be converted into pillared materials. These pillared materials, particularly silica pillared materials, may be capable of being exposed to severe conditions such as those encountered in calcining, e.g., at temperatures of about 450° C. for about two or more hours, e.g., four hours, in nitrogen or air, without significant decrease, e.g., less than about 10%, in interlayer distance.

The material having the X-ray diffraction pattern of Table 1, when intercepted in the swellable, intermediate state, prior to final calcination, may have the X-ray diffraction pattern shown in Table 2.

TABLE 2

| d(A) | I/I$_o$ |
|---|---|
| 13.53 ± 0.2 | m-vs |
| 12.38 ± 0.2 | m-vs |
| 11.13 ± 0.2 | w-s |
| 9.15 ± 0.1 | w-s |
| 6.89 ± 0.1 | w-m |
| 4.47 ± 0.10 | w-m |

TABLE 2-continued

| d(A) | I/I$_o$ |
|---|---|
| 3.95 ± 0.08 | w-vs |
| 3.56 ± 0.06 | w-m |
| 3.43 ± 0.06 | m-vs |
| 3.36 ± 0.05 | w-s |

An X-ray diffraction pattern trace for an example of such an as-synthesized, swellable material is shown in FIG. 1. A particular example of such an as-synthesized, swellable material is the material of Example 1 of the aforementioned U.S. Pat. No. 4,954,325. This material of Example 1 of U.S. Pat. No. 4,954,325 has the X-ray diffraction pattern given in the following Table 3.

TABLE 3

| 2 Theta | d(A) | I/I$_o$ × 100 |
|---|---|---|
| 3.1 | 28.5 | 14 |
| 3.9 | 22.7 | <1 |
| 6.53 | 13.53 | 36 |
| 7.14 | 12.38 | 100 |
| 7.94 | 11.13 | 34 |
| 9.67 | 9.15 | 20 |
| 12.85 | 6.89 | 6 |
| 13.26 | 6.68 | 4 |
| 14.36 | 6.17 | 2 |
| 14.70 | 6.03 | 5 |
| 15.85 | 5.59 | 4 |
| 19.00 | 4.67 | 2 |
| 19.85 | 4.47 | 22 |
| 21.56 | 4.12 | 10 |
| 21.94 | 4.05 | 19 |
| 22.53 | 3.95 | 21 |
| 23.59 | 3.77 | 13 |
| 24.98 | 3.56 | 20 |
| 25.98 | 3.43 | 55 |
| 26.56 | 3.36 | 23 |
| 29.15 | 3.06 | 4 |
| 31.58 | 2.833 | 3 |
| 32.34 | 2.768 | 2 |
| 33.48 | 2.676 | 5 |
| 34.87 | 2.573 | 1 |
| 36.34 | 2.472 | 2 |
| 37.18 | 2.418 | 1 |
| 37.82 | 2.379 | 5 |

Taking into account certain modifications, this swellable material may be swollen and pillared by methods generally discussed in the aforementioned U.S. Pat. No. 4,859,648, the entire disclosure of which is expressly incorporated herein be reference. The present modifications are discussed hereinafter and include the selection of proper swelling pH and swelling agent.

Upon being swollen with a suitable swelling agent, such as a cetyltrimethylammonium compound, the swollen material may have the X-ray diffraction pattern shown in Table 4.

TABLE 4

| d(A) | I/I$_o$ |
|---|---|
| >32.2 | vs |
| 12.41 ± 0.25 | w-s |
| 3.44 ± 0.07 | w-s |

The X-ray diffraction pattern of this swollen material may have additional lines with a d(A) spacing less than the line at 12.41 ±0.25, but none of said additional lines have an intensity greater than the line at the d(A) spacing of 12.41±0.25 or at 3.44±0.07, whichever is more intense. More particularly, the X-ray diffraction pattern of this swollen material may have the lines shown in the following Table 5.

TABLE 5

| d(A) | I/I$_o$ |
|---|---|
| >32.2 | vs |
| 12.41 ± 0.25 | w-s |
| 11.04 ± 0.22 | w |
| 9.28 ± 0.19 | w |
| 6.92 ± 0.14 | w |
| 4.48 ± 0.09 | w-m |
| 3.96 ± 0.08 | w-m |
| 3.57 ± 0.07 | w-m |
| 3.44 ± 0.07 | w-s |
| 3.35 ± 0.07 | w |

Even further lines may be revealed upon better resolution of the X-ray diffraction pattern. For example, the X-ray diffraction pattern may have additional lines at the following d(A) spacings (intensities given in parentheses): 16.7±4.0 (w-m); 6.11±0.24 (w); 4.05±0.08 (w); and 3.80±0.08 (w).

In the region with d<9 A, the pattern for the swollen material is essentially like the one given in Table 2 for the unswollen material, but with the possibility of broadening of peaks.

Figure 2:
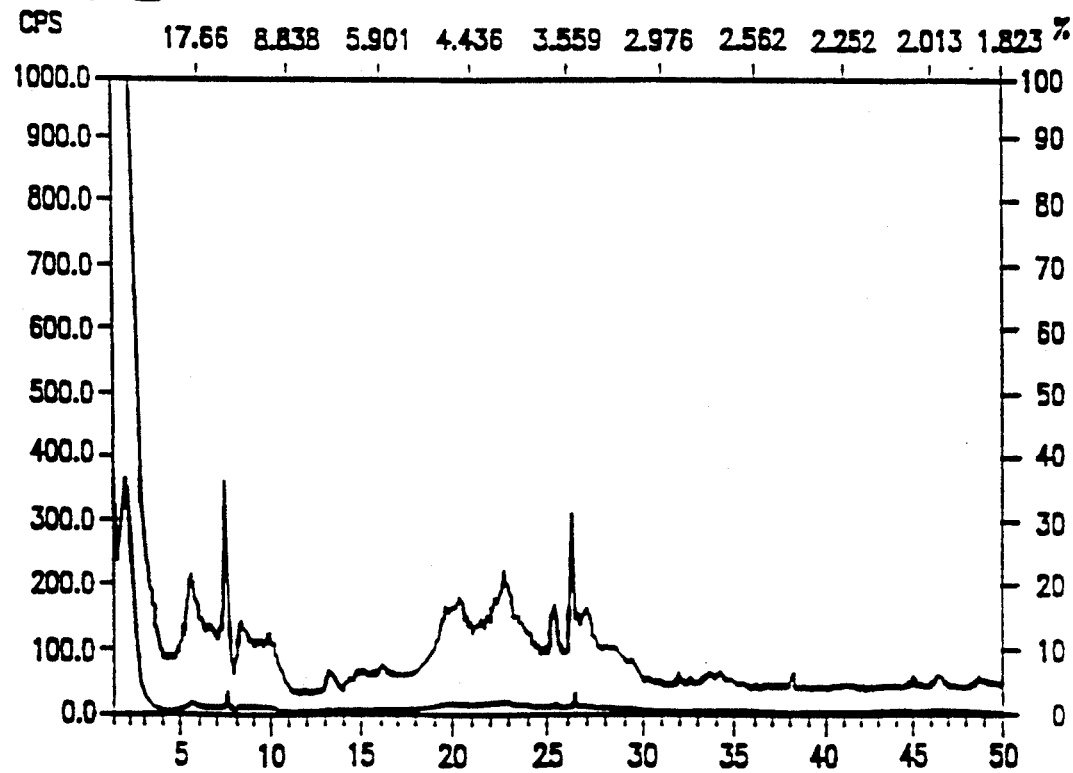
FIG. 2 is an X-ray diffraction pattern of a swollen form of the material having the X-ray diffraction pattern shown in FIG. 1.

An X-ray diffraction pattern trace for an example of such a swollen material is shown in FIG. 2. The upper profile is a 10-fold magnification of the lower profile in FIG. 2.

Upon being pillared with a suitable polymeric oxide, such as polymeric silica, the swollen material having the X-ray diffraction pattern shown in Table 4 may be converted into a material having the X-ray diffraction pattern shown in Table 6.

TABLE 6

| d(A) | I/I$_o$ |
|---|---|
| >32.2 | vs |
| 12.38 ± 0.25 | w-m |
| 3.42 ± 0.07 | w-m |

The X-ray diffraction pattern of this pillared material may have additional lines with a d(A) spacing less than the line at 12.38 ±0.25, but none of said additional lines have an intensity greater than the line at the d(A) spacing of 12.38±0.25 or 3.42±0.07, whichever is more intense. More particularly, the X-ray diffraction pattern of this pillared material may have the lines shown in the following Table 7.

TABLE 7

| d(A) | I/I$_o$ |
|---|---|
| >32.2 | vs |
| 12.38 ± 0.25 | w-m |
| 10.94 ± 0.22 | w-m |
| 9.01 ± 0.18 | w |
| 6.88 ± 0.14 | w |
| 6.16 ± 0.12 | w-m |
| 3.93 ± 0.08 | w-m |
| 3.55 ± 0.07 | w |
| 3.42 ± 0.07 | w-m |
| 3.33 ± 0.07 | w-m |

Even further lines may be revealed upon better resolution of the X-ray diffraction pattern. For example, the X-ray diffraction pattern may have additional lines at the following d(A) spacings (intensities given in parentheses): 5.59±0.11 (w); 4.42±0.09 (w); 4.11±0.08 (w); 4.04±0.08 (w); and 3.76±0.08 (w).

Figure 3:
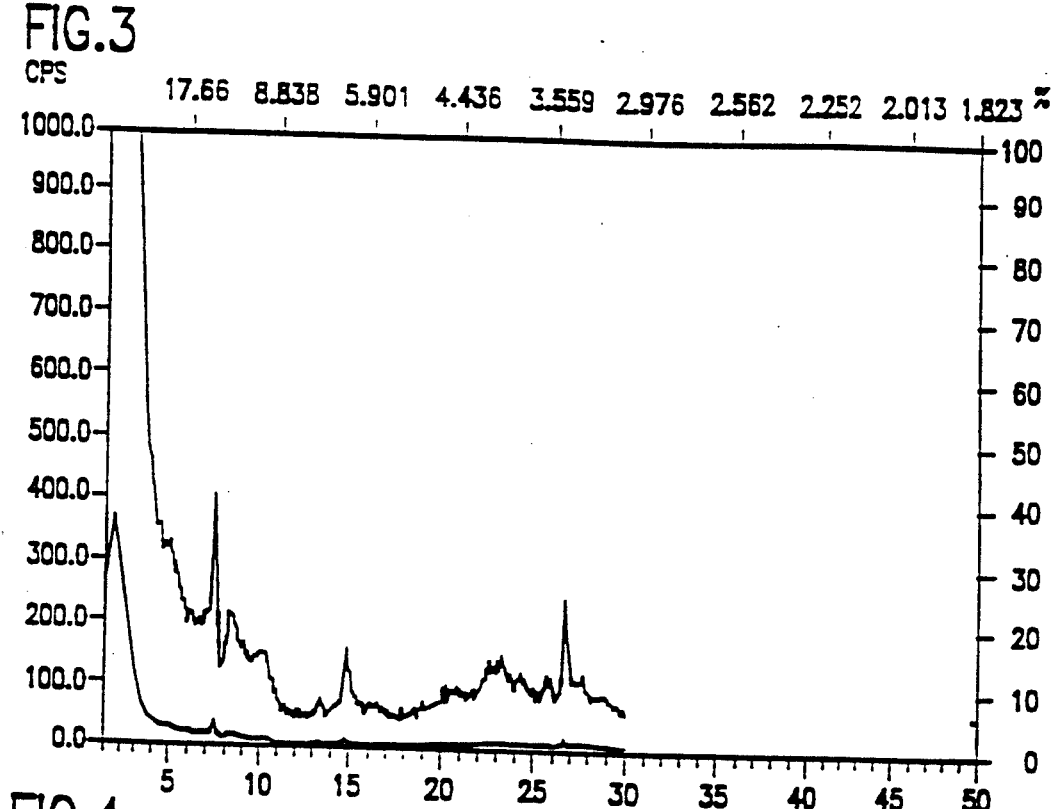
FIG. 3 is an X-ray diffraction pattern of the pillared form of the layered material having the X-ray diffraction patter shown in FIG. 1.

An X-ray diffraction pattern trace for an example of such a pillared material is given in FIG. 3. The upper profile is a 10-fold magnification of the lower profile in FIG. 3.

If the material swollen with a suitable swelling agent is calcined without prior pillaring another material is produced. For example, if the material which is swollen but not pillared is calcined in air for 6 hours at 540° C., a very strong line at a d(A) spacing of greater than 32.2 will no longer be observed. By way of contrast, when the swollen, pillared material is calcined in air for 6 hours at 540° C., a very strong line at a d(A) spacing of greater than 32.2 will still be observed, although the precise position of the line ma shift.

An example of a swollen, non-pillared material, which has been calcined, has the pattern as shown in Table 8.

TABLE 8

| 2 Theta | d(A) | I/I$_o$ × 100 | |
|---|---|---|---|
| 3.8 | 23.3 | 12 | |
| 7.02 | 12.59 | 100 | |
| 8.02 | 11.02 | 20 | |
| 9.66 | 9.16 | 14 | |
| 12.77 | 6.93 | 7 | |
| 14.34 | 6.18 | 45 | |
| 15.75 | 5.63 | 8 | |
| 18.19 | 4.88 | 3 | |
| 18.94 | 4.69 | 3 | |
| 19.92 | 4.46 | 13 | broad |
| 21.52 | 4.13 | 13 | shoulder |
| 21.94 | 4.05 | 18 | |
| 22.55 | 3.94 | 32 | |
| 23.58 | 3.77 | 16 | |
| 24.99 | 3.56 | 20 | |
| 25.94 | 3.43 | 61 | |
| 26.73 | 3.33 | 19 | |
| 31.60 | 2.831 | 3 | |
| 33.41 | 2.682 | 4 | |
| 34.62 | 2.591 | 3 | broad |
| 36.36 | 2.471 | 1 | |
| 37.81 | 2.379 | 4 | |

The X-ray powder pattern shown in Table 8 is similar to that shown in Table 1 except that most of the peaks in Table 8 are much broader than those in Table 1.

Figure 4:
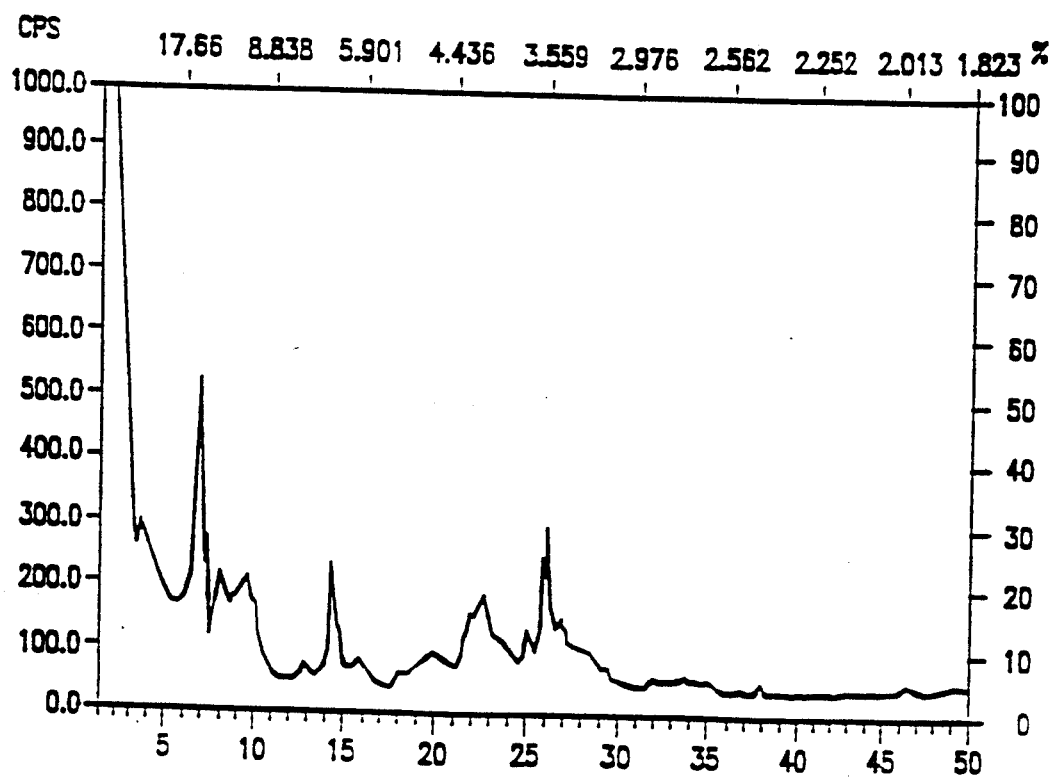
FIG. 4 is an X-ray diffraction pattern of the calcined form of the swollen material having the X-ray diffraction pattern shown in FIG. 2.

An X-ray diffraction pattern trace for an example of the calcined material corresponding to Table 8 is given in FIG. 4.

As mentioned previously, the calcined material corresponding to the X-ray diffraction pattern of Table 1 is designated MCM-22. For the purposes of the present disclosure, the pillared material corresponding to the X-ray diffraction pattern of Table is designated herein as MCM-36. The swollen material corresponding to the X-ray diffraction pattern of Table 4 is designated herein as the swollen MCM-22 precursor. The as-synthesized material corresponding to the X-ray diffraction pattern of Table 2 is referred to herein, simply, as the MCM-22 precursor.

The layers of the swollen material of this disclosure may have a composition involving the molar relationship:

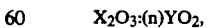

$X_2O_3:(n)YO_2$, wherein X is a trivalent element, such as aluminum, boron, iron and/or gallium, preferably aluminum, Y is a tetravalent element such as silicon and/or germanium, preferably silicon, and n is at least about 5, usually from about 10 to about 150, more usually from about 10 to about 60, and even more usually from about 10 to about 40.

To the extent that the layers of the swollen MCM-22 precursor and MCM-36 have negative charges, these negative charges are balanced with cations. For example, expressed in terms of moles of oxides, the layers of the swollen MCM-22 precursor and MCM-36 may have a ratio of 0.5 to 1.5 $R_2O:X_2O_3$, where R is a monovalent cation or 1/m of a cation of valency m.

MCM-36 adsorbs significant amounts of commonly used test adsorbate materials, i.e., cyclohexane, n-hexane and water. Adsorption capacities for this pillared material, especially the silica pillared material, may range at room temperature as follows:

| Adsorbate | Capacity, Wt. Percent |
|---|---|
| n-hexane | 17-40 |
| cyclohexane | 17-40 |
| water | 10-40 | wherein cyclohexane and n-hexane sorption are measured at 20 Torr and water sorption is measured at 12 Torr.

The swellable material, used to form the swollen material of the present disclosure, may be initially treated with a swelling agent. Such swelling agents are materials which cause the swellable layers to separate by becoming incorporated into the interspathic region of these layers. The swelling agents are removable by calcination, preferably in an oxidizing atmosphere, whereby the swelling agent becomes decomposed and/or oxidized.

Suitable swelling agents may comprise a source of organic cation, such as quaternary organoammonium or organophosphonium cations, in order to effect an exchange of interspathic cations. Organoammonium cations, such as n-octylammonium, showed smaller swelling efficiency than, for example, cetyltrimethylammonium. A pH range of 11 to 14, preferably 12.5 to 13.5 is generally employed during treatment with the swelling agent.

The as-synthesized material is preferably not dried prior to being swollen. This as-synthesized material may be in the form of a wet cake having a solids content of less than 30% by weight, e.g., 25 wt % or less.

The foregoing swelling treatment results in the formation of a layered oxide of enhanced interlayer separation depending upon the size of the organic cation introduced. In one embodiment, a series of organic cation exchanges can be carried out. For example, an organic cation may be exchanged with an organic cation of greater size, thus increasing the interlayer separation in a step-wise fashion. When contact of the layered oxide with the swelling agent is conducted in aqueous medium, water is trapped between the layers of the swollen species.

The organic-swollen species may be treated with a compound capable of conversion, e.g., by hydrolysis and/or calcination, to pillars of an oxide, preferably to a polymeric oxide. Where the treatment involves hydrolysis, this treatment may be carried out using the water already present in organic-swollen material. In this case, the extent of hydrolysis may be modified by varying the extent to which the organic-swollen species is dried prior to addition of the polymeric oxide precursor.

The organic-swollen species may be treated with a quaternary ammonium silicate, such as tetramethylammonium (TMA) silicate, which may be in an aqueous solution. Quaternary ammonium silicate is believed to be sorbed into the interspathic region of the swollen species. This interspathic quaternary ammonium silicate may be converted to interspathic silica by an appropriate calcination procedure.

It is advantageous to use a quaternary ammonium silicate, such as tetramethylammonium silicate (i.e., TMA-Si), instead of tetraethylorthosilicate (i.e., TEOS) as a pillaring agent. TMA-Si is less costly, easier to use and less toxic than TEOS. When TEOS is used, care must be taken to dry the swollen MCM-22 precursor to remove excess water, while retaining sufficient water in between the layers to promote hydrolysis of the TEOS. When TMA-Si is used, such careful drying is not necessary, and the swollen MCM-22 precursor may be pillared in a wet state.

It is preferred that any organic cation deposited between the layers is capable of being removed from the pillared material without substantial disturbance or removal of the interspathic pillars. For example, organic cations such as cetyltrimethylammonium may be removed from the pillared layered product by exposure to elevated temperatures, e.g., calcination, in nitrogen or air, or by chemical oxidation.

These pillared layered products, especially when calcined, exhibit high surface area, e.g., greater than 500 $m^2/g$, and thermal and hydrothermal stability making them highly useful as catalysts or catalytic supports, for hydrocarbon conversion processes, for example, alkylation.

Insertion of the organic cation between the adjoining layers serves to physically separate the layers in such a way as to make the layered material receptive to the interlayer addition of pillars. In particular, cetyltrimethylammonium cations have been found useful. These cations are readily incorporated within the interlayer spaces of the layered oxide serving to prop open the layers in such a way as to allow incorporation of the pillars. The extent of the interlayer spacing can be controlled by the size of the organoammonium ion employed.

After calcination to remove the organic propping agent, the final pillared product may contain residual exchangeable cations. Such residual cations in the layered material can be ion exchanged by known methods with other cationic species to provide or alter the catalytic activity of the pillared product. Suitable replacement cations include cesium, cerium, cobalt, nickel, copper, zinc, manganese, platinum, lanthanum, aluminum, ammonium, hydronium and mixtures thereof.

The present pillared products exhibit thermal stability at temperatures of 450° C. or even higher as well as substantial sorption capacities (as much as 17 to 40 wt % for $C_6$ hydrocarbon). The pillared products may possess a basal spacing of at least about 32.2A and surface areas greater than 500 $m^2/g$.

MCM-36 can optionally be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or intimately physically admixed therewith. Such component can be impregnated in, or on, the layered material such as, for example, by, in the case of platinum, treating the layered material with a solution containing a platinum metal-containing ion. Thus, suitable platinum compounds for this purpose include chloroplatinic acid, platinous chloride and various compounds containing the platinum amine complex.

The layered material may be subjected to thermal treatment, e.g., to decompose organoammonium ions. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience.

Prior to its use in catalytic processes described herein, MCM-36 is preferably dehydrated, at least partially. This dehydration can be done by heating the crystals to a temperature in the range of from about 200° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the layered material in a vacuum, but a longer time is required to obtain a sufficient amount of dehydration.

The catalyst can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, MCM-36 can be extruded before drying or partially dried and then extruded.

It may be desired to incorporate MCM-36 with another material which is resistant to the temperatures and other conditions employed in the catalytic processes described herein. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with MCM-36, i.e., combined therewith or present during its synthesis, which itself is catalytically active may change the conversion and/or selectivity of the catalyst. Inactive materials suitably serve as diluents to control the amount of conversion so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use, it is desirable to prevent the catalyst from breaking down into powder-like materials. These clay binders have been employed normally only for the purpose of improving the crush strength of the catalyst.

Naturally occurring clays which can be composited with MCM-36 include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with layered materials also include inorganic oxides, notably alumina.

In addition to the foregoing materials, MCM-36 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of finely divided MCM-36 and inorganic oxide matrix vary widely, with MCM-36 content ranging from about 1 to about 90 percent by weight and more usually, particularly when the composite is prepared in the form of beads, in the range of about 2 to about 80 weight of the composite.

MCM-36 is useful as a catalyst component for a variety of organic, e.g., hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g., benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g., methanol, or ethers, e.g., dimethylether, or mixtures thereof to hydrocarbons including aromatics with reaction conditions including a temperature of from about 300° C. to about 550° C., more preferably from about 370° C. to about 500° C., a pressure of from about 0.01 psi to about 2000 psi, more preferably from about 0.1 psi to about 500 psi, and a liquid hourly space velocity of from about 0.5 to about 100; isomerizing xylene feedstock components with reaction conditions including a temperature of from about 230° C. to about 510° C. a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating isoalkanes, e.g., isobutane, with olefins, e.g., 2-butene, with reaction conditions including a temperature of from about $-25°$ C. to about 400° C., e.g., from about 75° C. to about 200° C., a pressure of from below atmospheric to about 5000 psig, e.g., from about atmospheric to about 1000 psig, a weight hourly space velocity based on olefin of from about 0.01 to about 100, e.g., from about 0.1 to about 20, and a mole ratio of total isoalkane to total olefin of from about 1:2 to about 100:1, e.g., from about 3:1 to about 30:1; alkylating aromatic hydrocarbons, e.g., benzene and alkylbenzenes, in the presence of an alkylating agent, e.g., olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1; and reacting olefins, e.g., isobutene or isopentene, with alcohols, e.g., methanol, to produce ethers with reaction conditions including a temperature of from about 20° C. to about 200° C., a total system pressure of from about 1 to about 200 atmospheres, an alcohol to olefin mole ratio of from about 0.1 to about 5 and a weight hourly space velocity of from 0.1 to about 200; converting light olefins, e.g., having 2 to 7 carbon atoms, to alcohol(s), ether(s) or mixtures thereof by reacting said light olefins with water under reaction conditions including a temperature from about 50° C. to about 300° C., a total pressure of at least about 5 atmospheres; and a mole ratio of water to total olefin of from about 0.1 to about 30; and transferring hydrogen from paraffins to olefins with reaction conditions including a temperature from about −25° C. to about 400° C., e.g., from about 75° C. to about 200° C., a pressure from below atmospheric to about 5000 psig, e.g., from about atmospheric to about 1000 psig, a mole ratio of total paraffin to total olefin of from about 1:2 to about 500:1, e.g., from about 5:1 to about 100:1; and a weight hourly space velocity based on olefin of from about 0.01 to about 100, e.g., from about 0.05 to about 5.

Alpha values are reported in certain examples appearing hereinafter. It is noted that the Alpha Value is a approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in the *Journal of Catalysis,* Vol. 4, p. 527 (1965); Vol. 6, p. 278 (1966); and Vol. 61, p. 395 (1980), each incorporated herein by reference as to that description. The experimental conditions of the test preferably include a constant temperature of 538° C. and a variable flow rate as described in detail in the *Journal of Catalysis,* Vol. 61, p. 395.

Various crystallites from the Examples which follow were examined by transition electron microscopy (TEM).

EXAMPLE 1

This Example describes the synthesis of a material which may be swollen and pillared. Water, sodium hydroxide, sodium aluminate, silica (Ultrasil), and hexamethyleneimine (HMI) were combined in the following mole ratios:

2.5 Na$_2$O: Al$_2$O$_3$: 30 SiO$_2$: 10 HMI: 580 H$_2$O.

The reaction mixture was heated in an autoclave to 143° C. for 96 hours. The X-ray diffraction pattern for this material is shown pictorially in FIG. 1.

EXAMPLE 2

A swelling reagent was prepared by contacting a 29% solution of cetyltrimethylammonium (N,N,N-trimethyl-1-hexadecanaminium) chloride with a hydroxide-for-halide exchange resin (on liter of wet resin with 1.4 milliequivalent/ml exchange capacity per 3 l of the solution). It will be referred to as 29% CTMA-OH.

A mixture of 30 g of the Example 1 wet cake (30% solids) and 150 g of the 29% CTMA-OH solution was reacted in the steambox for 65 hours. The product was isolated by filtration, washed twice with 50 ml of water and air dried overnight yielding 10.6 g of the swollen product. The X-ray diffraction pattern for this swollen material is shown pictorially in FIG. 2. The X-ray diffraction pattern for this swollen material is also given in the following Table 9.

TABLE 9

| 2 Theta | d(A) | I/I$_o$ × 100 |     |
|---------|-------|---------------|-----|
| 1.7     | 52.0  | 100           |     |
| 2.8     | 31.6  | 20            |     |
| 5.24    | 16.86 | 10            |     |
| 5.61    | 15.75 | 6             |     |
| 7.13    | 12.40 | 32            |     |
| 7.99    | 11.06 | 5             |     |
| 9.58    | 9.23  | 3             |     |
| 12.81   | 6.91  | 3             |     |
| 13.98   | 6.33  | 1             | broad |
| 14.60   | 6.07  | 2             |     |
| 15.69   | 5.65  | 2             |     |
| 19.60   | 4.53  | 11            | broad |
| 21.29   | 4.17  | 12            |     |
| 21.92   | 4.05  | 6             |     |
| 22.44   | 3.96  | 10            |     |
| 23.27   | 3.82  | 6             | broad shoulder |
| 24.94   | 3.57  | 9             |     |
| 25.93   | 3.44  | 26            |     |
| 26.60   | 3.35  | 8             |     |
| 28.00   | 3.19  | 3             | broad |
| 29.08   | 3.07  | 1             |     |
| 31.51   | 2.839 | 2             |     |
| 33.09   | 2.707 | 1             | broad |
| 33.75   | 2.656 | 1             | broad |
| 34.70   | 2.585 | 1             | broad |
| 36.30   | 2.475 | 1             |     |
| 37.09   | 2.424 | 1             |     |
| 37.74   | 2.384 | 3             |     |

TEM analysis of crystallites confirm the separation of layers by the swelling procedure.

EXAMPLE 3

TMA-silicate solution may be purchased from SWAC, Inc. It is an aqueous solution containing 10% SiO$_2$ and having molar TMA/Si ratio equal 0.5.

100 g of the swollen material from Example 2 was slurried with 500 g of the above solution and contacted for 20 hr in a steambox. The solid was filtered off and air dried without washing. After calcination it produced a solid with XRD pattern and porosity values (BET=740 m$^2$/g, and adsorption capacity for water, cyclohexane, and n-hexane equal 35.5, 31.2, and 28.0, respectively) characteristic for a high quality MCM-36.

EXAMPLE 4

A mixture of a 29% solution of cetyltrimethylammonium (N,N,N-trimethyl-1-hexadecanaminium) hydroxide, 40% tetrapropylammonium hydroxide and wet cake of Example 1 (20% solids) in the relative weight ratio 105:33:27, respectively, was heated in an autoclave at 105° C. with stirring for 42 hours. The solid product was isolated by decantation and filtration, and the wet cake was washed twice by mixing with water and filtration. The swollen material had the X-ray diffraction pattern given in the following Table 10.

TABLE 10

| 2 Theta | d(A) | $I/I_o \times 100$ |
|---|---|---|
| 1.6 | 5.2 | 100 |
| 4.88 | 18.1 | 2 |
| 6.3 | 13.85 | 3 |
| 7.15 | 12.36 | 21 |
| 7.96 | 11.11 | 6 |
| 9.47 | 9.34 | 4 |
| 2.81 | 6.91 | 2 |
| 14.56 | 6.08 | 1 |
| 19.99 | 4.44 | 9 |
| 21.44 | 4.14 | 5 |
| 21.88 | 4.06 | 7 |
| 22.44 | 3.96 | 8 |
| 23.35 | 3.81 | 3 |
| 24.91 | 3.57 | 6 |
| 25.90 | 3.44 | 21 |
| 26.53 | 3.36 | 4 |

EXAMPLE 5

The product of Example 4 (24% solids) was combined with a 10% solution of silica in aqueous tetramethylammonium hydroxide (molar ratio TMA:SiO$_2$=0.5) in a weight ratio 1:15. The mixture was heated for 20 hr in the steambox, filtered and air dried. The solid was contacted three times with 1M ammonium nitrate (10 ml per 1 ml of solids) and the final product was obtained upon calcination at 540° C. The pillared, calcined material had the X-ray diffraction pattern given in the following Table 11.

TABLE 11

| 2 Theta | d(A) | $I/I_o \times 100$ |
|---|---|---|
| 1.9 | 46.5 | 100 |
| 7.17 | 12.33 | 9.0 |
| 8.13 | 10.87 | 3.1 |
| 9.88 | 8.95 | 1.4 |
| 12.90 | 6.86 | 0.9 |
| 14.41 | 6.15 | 3.7 |
| 16.01 | 5.54 | 0.9 |
| 20.16 | 4.40 | 1.5 |
| 21.12 | 4.21 | 0.9 |
| 21.65 | 4.10 | 1.4 |
| 22.03 | 4.03 | 2.2 |
| 22.67 | 3.92 | 3.1 |
| 23.78 | 3.74 | 1.8 |
| 25.10 | 3.55 | 2.2 |
| 26.08 | 3.42 | 7.8 |
| 26.84 | 3.32 | 2.2 |

EXAMPLE 6

This Example describes another embodiment of swelling the material of Example 1 using a different swelling medium. The swelling reagent, was prepared by contacting a solution of cetyltrimethylammonium (N,N,N-trimethyl-1-hexadecanaminium) chloride composed of 50% of the latter, 35% 2-propanol and 15% water, with a hydroxide-for-halide exchange resin (two exchanges using ½ liter of wet resin with 1.4 milliequivalent/ml exchange capacity per 1 l of the solution; 200 ml of ethanol was also added). It will be referred to as 50% CTMA-OH.

300 ml of the slurry containing about 20% of the material of Example 1 was mixed with 300 ml of the 50% CTMA-OH solution. The mixture was heated in a 1 l autoclave for 24 hours at 150° C. with stirring. The product was isolated by filtration, washed twice with 400 ml of water and air dried overnight yielding about 140 g of the swollen product. The X-ray diffraction pattern for this swollen material is given in the following Table 12.

TABLE 12

| 2 Theta | d(A) | $I/I_o \times 100$ | |
|---|---|---|---|
| 1.8 | 49.1 | 100 | |
| 5.18 | 17.06 | 25 | |
| 7.20 | 12.28 | 55 | |
| 8.09 | 10.93 | 9 | |
| 9.60 | 9.21 | 7 | |
| 12.87 | 6.88 | 4 | |
| 14.67 | 6.04 | 3 | |
| 15.80 | 5.61 | 2 | |
| 19.73 | 4.50 | 22 | broad |
| 21.45 | 4.14 | 18 | |
| 22.00 | 4.04 | 5 | |
| 22.52 | 3.95 | 22 | |
| 23.39 | 3.80 | 9 | broad shoulder |
| 25.03 | 3.56 | 19 | |
| 26.02 | 3.42 | 59 | |
| 26.69 | 3.34 | 16 | |
| 29.19 | 3.06 | 3 | |
| 31.60 | 2.831 | 3 | |
| 33.16 | 2.702 | 2 | |
| 36.37 | 2.470 | 2 | |
| 37.02 | 2.428 | 1 | |
| 37.82 | 2.379 | 7 | |

EXAMPLE 7

This Example describes swelling of the material prepared from the synthesis mixture of Example 1 that has been crystallized for 48 hours (see below) rather than 96 hours.

The combination of 504 g of water, 11.4 g of 50% sodium hydroxide, 11.4 g of sodium aluminate (43.5% Al$_2$O$_3$, 30% Na$_2$O), 64.9 g of silica (Ultrasil) and 34.2 g of hexamethyleneimine was reacted in an autoclave at 143° C. for 48 hours with stirring. The product was filtered and washed thoroughly with water.

500 g of the wet cake material (24% solids) described above was mixed with 3 l of 29% CTMA-OH solution and stirred for 48 hours at room temperature. The swollen product was isolated by filtration, washed twice with 500 ml of water and air dried overnight. The X-ray diffraction pattern for this swollen material is given in the following Table 13.

TABLE 13

| 2 Theta | d(A) | $I/I_o \times 100$ | |
|---|---|---|---|
| 1.7 | 52.0 | 100 | |
| 5.18 | 17.06 | 7.3 | |
| 6.81 | 12.98 | 2.3 | |
| 7.10 | 12.4 | 5.7 | |
| 8.79 | 10.06 | 2.7 | very broad |
| 12.73 | 6.95 | 0.6 | |
| 13.82 | 6.41 | 0.4 | |
| 14.55 | 6.09 | 0.3 | |
| 15.59 | 5.68 | 0.7 | |
| 18.39 | 4.82 | 1.3 | broad shoulder |
| 19.06 | 4.66 | 2.6 | shoulder |
| 19.77 | 4.49 | 4.8 | |
| 21.01 | 4.23 | 3.4 | broad |
| 22.28 | 3.99 | 5.0 | |
| 23.35 | 3.81 | 2.3 | broad shoulder |
| 24.91 | 3.57 | 3.0 | |
| 25.90 | 3.44 | 8.0 | |
| 26.50 | 3.36 | 4.4 | |

EXAMPLE 8

This Example describes a preparation involving pillaring with an aqueous solution of tetramethylammonium silicate, TMA-Si, previously defined in Example 5 and formulation of the alumina bound catalyst.

The swollen product was obtained by reacting 330 g of the Example 1 wet cake (42% solids) and 2700 ml of 29% CTMA-OH for 48 hours in the steambox. The solid was isolated by filtration, washed by contacting with 0.5 l of water and air dried. The X-ray diffraction pattern of this swollen material is given in the following Table 14.

TABLE 14

| 2 Theta | d(A) | $I/I_o \times 100$ | |
|---|---|---|---|
| 1.7 | 52.0 | 100 | |
| 2.7 | 32.7 | 28.1 | |
| 5.38 | 16.43 | 10.8 | |
| 7.12 | 12.41 | 14.5 | |
| 8.10 | 10.91 | 2.9 | |
| 9.61 | 9.20 | 1.5 | broad |
| 12.77 | 6.93 | 1.0 | |
| 14.50 | 6.11 | 0.9 | |
| 19.88 | 4.47 | 6.8 | broad |
| 21.41 | 4.15 | 6.6 | |
| 21.94 | 4.05 | 4.4 | |
| 22.46 | 3.96 | 7.7 | |
| 23.05 | 3.86 | 3.3 | shoulder |
| 23.60 | 3.77 | 3.2 | shoulder |
| 24.93 | 3.57 | 4.8 | |
| 25.93 | 3.44 | 12.4 | |
| 26.55 | 3.36 | 4.7 | broad |

25 g of the above swollen material was slurried with 150 g of the TMA-Si solution and heated in a steambox for 20 hours. The solid product was filtered and air dried (yield 31 g). A small sample was calcined to verify that it was the pillaring was successful.

The remainder of the product was mixed with alumina alpha-monohydrate (Kaiser alumina) (solid ratio 65:35) and ion exchanged by contacting three times with 1M ammonium nitrate. After drying, the solid was pelletized and was calcined by a hybrid method: 3 hr in nitrogen at 450° C. followed by slow bleeding of air and full air calcination at 540° C. for 6 hours.

EXAMPLE 9

This Example describes the preparation, swelling and pillaring of the material related to that of Example 1 but with a higher content of alumina (Si/Al$_2$ ratio around 18).

A combination of 258 g of water, 6 g of 50% sodium hydroxide, 13.4 g of sodium aluminate (25% Al$_2$O$_3$, 19% Na$_2$O), 51:4 g of silica (Ultrasil), and 27.1 g of hexamethyleneimmine was reacted in an autoclave at 143° C. for 34 hours with stirring. The solid product was isolated by filtration and washed with water.

70 g of the above wet cake (about 20% solids) was swollen by contacting with 300 ml of 29% CTMA-OH for 43 hours at room temperature with stirring. The product was isolated by filtration, washed with water and air dried. It was then pillared (19 g) by mixing with TMA-Si (113 g) and heating in the steambox for 20 hr. Further processing, including binding with alumina, exchange and calcination was carried out as in Example 8. The X-ray diffraction pattern for this pillared, calcined material is given in the following Table 15.

TABLE 15

| 2 Theta | d(A) | $I/I_o \times 100$ | |
|---|---|---|---|
| 1.5 | 58.9 | 100 | |
| 7.13 | 12.40 | 55 | |
| 8.20 | 10.78 | 19 | broad |
| 12.84 | 6.89 | 5 | |
| 14.41 | 6.15 | 26 | |
| 15.56 | 5.69 | 5 | |
| 20.04 | 4.43 | 9 | |
| 21.70 | 4.10 | 9 | broad shoulder |
| 22.14 | 4.01 | 12 | broad |
| 22.60 | 3.93 | 19 | broad |
| 23.50 | 3.79 | 13 | broad |
| 25.09 | 3.55 | 11 | |
| 26.04 | 3.42 | 33 | |
| 26.64 | 3.35 | 21 | |

EXAMPLE 10

This Example describes swelling of the material of Example 1 with dodecyltrimethylammonium chloride/-hydroxide. The swelling reagent, was prepared by contacting a 33% solution of dodecyltrimethylammonium (N,N,N-trimethyl-1-dodecanaminium) chloride with a hydroxide-for-halide exchange resin (one liter of wet resin with 1.4 milliequivalent/ml exchange capacity per 2 l of the solution). It will be referred to as 33% DOTMA-OH.

The wet cake of Example 1 (50 g, about 20% solids) was mixed with 500 ml g of DOTMA-OH and heated in the steambox for 48 hours. The solid was isolated by filtration and washed with water. The air dried product showed X-ray diffraction pattern similar to that of FIG. 2 with a very intense low angle line. The X-ray diffraction pattern for this swollen material is given in the following Table 16.

TABLE 16

| 2 Theta | d(A) | $I/I_o \times 100$ | |
|---|---|---|---|
| 1.7 | 52.0 | 100 | |
| 6.15 | 14.37 | 25 | broad |
| 6.31 | 14.01 | 6 | |
| 7.02 | 12.59 | 18 | |
| 7.92 | 11.16 | 6 | |
| 9.39 | 9.42 | 11 | |
| 12.74 | 6.95 | 6 | |
| 14.13 | 6.27 | 7 | broad |
| 15.63 | 5.67 | 7 | |
| 18.88 | 4.70 | 11 | broad |
| 19.95 | 4.45 | 20 | broad |
| 22.34 | 3.98 | 17 | |
| 23.49 | 3.79 | 7 | |
| 24.85 | 3.58 | 13 | |
| 25.81 | 3.45 | 28 | |
| 26.57 | 3.35 | 12 | |
| 27.93 | 3.19 | 14 | |

A portion of the swollen product was mixed with the TMA-silicate solution described above (Example 5) in the weight ratio 1:10, respectively. After 20 hours reaction in the steambox the solid was filtered off, air dried and contacted three times with 1M ammonium nitrate. The final product, obtained by calcination at 540° C. had a pattern essentially as described in Table 4. More particularly, the X-ray diffraction pattern for this pillared, calcined material is given in the following Table 17.

TABLE 17

| 2 Theta | d(A) | $I/I_o \times 100$ |
|---|---|---|
| 1.8 | 49.1 | 100 |
| 7.13 | 12.40 | 32 |

TABLE 17-continued

| 2 Theta | d(A) | I/I$_o$ × 100 |
|---|---|---|
| 8.00 | 11.05 | 13 |
| 9.88 | 8.95 | 11 |
| 12.88 | 6.87 | 4 |
| 14.32 | 6.18 | 15 |
| 15.94 | 5.56 | 4 |
| 18.17 | 4.88 | 2 |
| 20.30 | 4.37 | 8 broad |
| 21.57 | 4.12 | 6 |
| 21.96 | 4.05 | 10 |
| 22.65 | 3.93 | 15 |
| 23.75 | 3.75 | 10 |
| 25.04 | 3.56 | 9 |
| 26.06 | 3.42 | 29 |
| 26.86 | 3.32 | 9 |
| 27.66 | 3.22 | 6 broad |

EXAMPLE 11

The Alpha values for the products from Examples 5 and 8 were measured to be 75 and 116, respectively.

What is claimed is:

1. A method for preparing pillared layered material, desginated MCM-36, said method comprising the steps of:
   (i) preparing a reaction mixture capable of forming a layered material upon crystallization, said reaction mixture containing sufficient amounts of alkali or alkaline earth metal cations, a source of silica containing at least about 30 wt % solid silica, an oxide of aluminum, water and hexamethyleneimine;
   (ii) maintaining said reaction mixture under sufficient crystallization conditions until crystals of layered material are formed;
   (iii) swelling said layered material of step (ii) by contacting said layered material with a suitable swelling agent, and
   (iv) pillaring the swollen material of step (iii) by contacting the swollen material with a quaternary ammonium silicate solution under conditions sufficient to pillar said swollen material.

2. A method according to claim 1, wherein said reaction mixture has a composition in terms of mole ratios within the following ranges:

| | |
|---|---|
| SiO$_2$/Al$_2$O$_3$ = | 10 to 80 |
| H$_2$O/SiO$_2$ = | 5 to 100 |
| OH$^-$/SiO$_2$ = | 0.01 to 1.0 |
| M/SiO$_2$ = | 0.05 to 1.0 |
| R/SiO$_2$ = | 0.05 to 1.0 | wherein R represents hexamethyleneimine and M represents alkali or alkaline earth metal.

3. A method according to claim 2, wherein said reaction mixture has a composition in terms of mole ratios within the following ranges:

| | |
|---|---|
| SiO$_2$/Al$_2$O$_3$ = | 10 to 60 |
| H$_2$O/SiO$_2$ = | 10 to 50 |
| OH$^-$/SiO$_2$ = | 0.1 to 0.5 |
| M/SiO$_2$ = | 0.1 to 1.0 |
| R/SiO$_2$ = | 0.1 to 0.5 |

4. A method according to claim 1, wherein said reaction mixture further comprises a sufficient amount of crystal formation enhancing seed crystals.

5. A method according to claim 1, wherein said solid silica source is a precipitated, spray dried silica.

6. A method according to claim 1, wherein said swelling agent comprises an organoammonium ion.

7. A method according to claim 1, wherein said layered material of step (ii) has the X-ray diffraction pattern of Table 2, the swollen material of step (iii) has the X-ray diffraction pattern of Table 4, said swelling agent comprises a cetyltrimethylammonium cation, and the pillared material of step (iv) has the X-ray diffraction pattern of Table 6.

8. A method according to claim 1, wherein said swelling agent comprises a cetyltrimethylammonium ion.

9. A method according to claim 1, wherein the swelling step (iii) is conducted at a pH range of 11 to 14.

10. A method according to claim 1, wherein the swelling step (iii) is conducted at a pH range of 12.5 to 13.5.

11. A method according to claim 1, wherein said quaternary ammonium silicate solution is an aqueous tetraalkylammonium silicate solution, wherein the alkyl groups of the tetraalkylammonium silicate are the same or different and have from 1 to 5 carbon atoms.

12. A method according to claim 11, wherein the concentration of silicate, expressed in terms of SiO$_2$, is from about 1 to about 30 weight percent.

13. A method according to claim 12, wherein the molar ratio of quaternary ammonium to silicon is from about 0.01 to about 10.

14. A method according to claim 13, wherein said quaternary ammonium silicate is tetramethylammonium silicate.

15. A method according to claim 14, wherein the molar ratio of tetramethylammonium to silicon is about 0.5.

16. A method according to claim 14 further comprising the step of calcining the pillared material of step (iv) under conditions sufficient to remove residual organic material therefrom.

17. A method according to claim 16, wherein cations in the pillared material of step (iv) are exchanged with ammonium prior to calcination of the pillared material.

* * * * *